United States Patent
Kataoka

(10) Patent No.: US 8,427,295 B2
(45) Date of Patent: Apr. 23, 2013

(54) VEHICLE-INSTALLED DISPLAY SYSTEM AND CONTROL METHOD THEREOF

(75) Inventor: Hiroaki Kataoka, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 592 days.

(21) Appl. No.: 12/634,094

(22) Filed: Dec. 9, 2009

(65) Prior Publication Data

US 2010/0219947 A1    Sep. 2, 2010

(30) Foreign Application Priority Data

Feb. 27, 2009    (JP) ................. 2009-047040

(51) Int. Cl.
*B60Q 1/00* (2006.01)
(52) U.S. Cl.
USPC ........... 340/461; 340/438; 340/459; 340/901; 340/905
(58) Field of Classification Search ................. 340/461, 340/905
See application file for complete search history.

(56) References Cited

U.S. PATENT DOCUMENTS

| | | | | |
|---|---|---|---|---|
| 4,555,694 A * | 11/1985 | Yanagishima et al. | ........ | 340/524 |
| 5,764,139 A | 6/1998 | Nojima et al. | | |
| 6,429,845 B1 * | 8/2002 | Unseld et al. | ................. | 345/618 |
| 6,870,469 B2 * | 3/2005 | Ueda | ............................ | 340/438 |

FOREIGN PATENT DOCUMENTS

| | | | |
|---|---|---|---|
| JP | 61021853 A | | 1/1986 |
| JP | 04324494 A | * | 11/1992 |
| JP | 4324494 A | | 11/1992 |
| JP | 6248617 A | | 9/1994 |
| JP | 07198425 A | | 8/1995 |
| JP | 09123848 A | | 5/1997 |
| JP | 2003345330 A | | 12/2003 |
| JP | 2003345330 A | * | 12/2003 |
| JP | 2006003875 A | | 1/2006 |
| JP | 2008305096 A | | 12/2008 |

* cited by examiner

*Primary Examiner* — Kerri McNally
(74) *Attorney, Agent, or Firm* — Gifford, Krass, Sprinkle, Anderson & Citowski, P.C.

(57) ABSTRACT

A vehicle-installed display system for displaying two or more items of information one after another in a given display area includes a recognition time estimating unit that estimates a recognition time required for the driver to recognize information displayed in the given display area, with respect to each of the two or more items of information, and an output switching unit that switches the information displayed in the given display area from one item of information to another, based on the recognition time estimated by the recognition time estimating unit for each item of information.

17 Claims, 8 Drawing Sheets

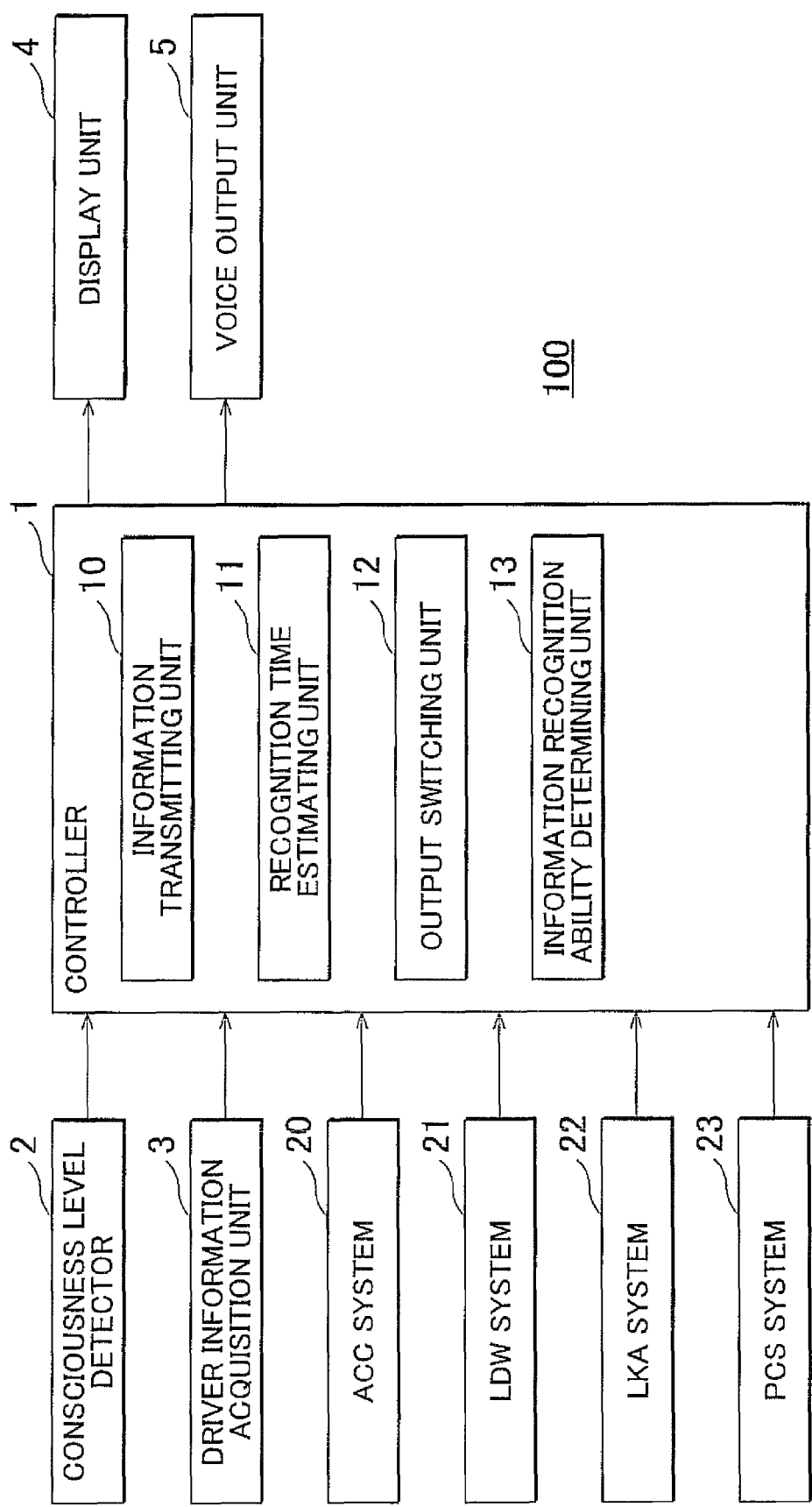

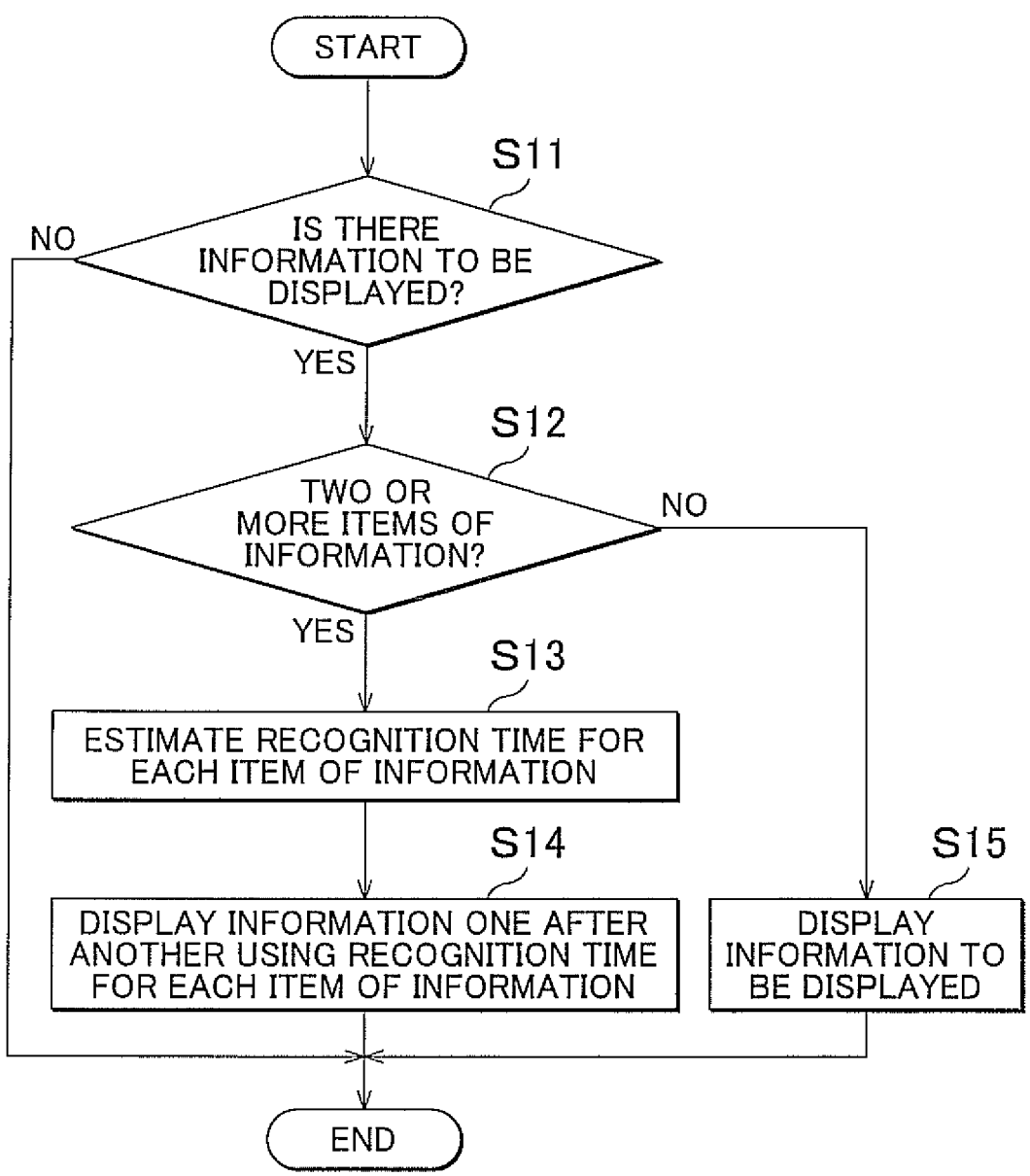

VEHICLE-INSTALLED DISPLAY SYSTEM AND CONTROL METHOD THEREOF

INCORPORATION BY REFERENCE

The disclosure of Japanese Patent Application No. 2009-047040 filed on Feb. 27, 2009 including the specification, drawings and abstract is incorporated herein by reference in its entirety.

BACKGROUND OF THE INVENTION

1. Field of the Invention

The invention relates to a vehicle-installed display system for displaying a plurality of items of information in a given display area and a control method thereof.

2. Description of the Related Art

As a known display method (as described in, for example, Japanese Patent Application Publication No. 2003-345330 (JP-A-2003-345330)), when a vehicle-installed display device having only a small display area receives a plurality of items of information to be displayed at a time in a concentrated manner, the display device sequentially and cyclically displays these items of information one after another while switching the display at intervals of a predetermined display time (e.g., 3 seconds).

The above display method is intended to avoid the following situation: if the display device displays a plurality of items of information one after another, using a standard display time (e.g., 10 seconds) predetermined as a period of time for which a single item of information is displayed, it takes at least 20 seconds before the driver visually recognizes the third item of information, for example, resulting in a delay in transmission of the information.

According to the display method as described in JP-A-2003-345330, the display is switched from one item of information to another at the time when a specified display time (e.g., 3 seconds) expires, even though the contents of the respective items of information displayed are different from each other. In some cases, therefore, the driver may not be able to sufficiently recognize the content of a certain item of information within one display time (3 seconds), which is too short for some items of information to be recognized. In other cases, the driver may feel uncomfortable or get embarrassed since the specified display time (3 seconds) is too long for some items of information, thus causing an unnecessary delay in display of the next item of information.

SUMMARY OF THE INVENTION

The invention provides a vehicle-installed display system and a vehicle-installed display control system, which enable the driver to efficiently recognize the contents of a plurality of items of information.

A first aspect of the invention provides a vehicle-installed display system for displaying a plurality of items of information one after another in a given display area, which includes: a recognition time estimating unit that estimates a recognition time required for a driver to recognize information displayed in the given display area, with respect to each of the above-indicated plurality of items of information, and an output switching unit that switches the information displayed in the given display area from one item of information to another, based on the recognition time estimated by the recognition time estimating unit for each item of information.

In the vehicle-installed display system according to the first aspect of the invention, the recognition time estimating unit may estimate the recognition time for each item of information, based on the amount of information in the information displayed in the given display area.

In the vehicle-installed display system according to the first aspect of the invention, the recognition time estimating unit may estimate the recognition time for each item of information, based on at least one of the number of words in textual information, the number of characters in the textual information, the number of pixels in the textual information, a color of the characters, a size of the characters, a font of the characters, a color of graphic information, a size of the graphic information, and a background color of the graphic information, which are included in the information displayed in the given display area.

In the vehicle-installed display system according to the first aspect of the invention, the recognition time estimating unit may estimate the recognition time for each item of information, based on a content of the information displayed in the given display area, and the content includes at least one of a content representing a status condition of an event that occurs at present, and a content representing a measure which the driver can take against the status condition. In this case, the recognition time estimating unit may set the recognition time for information having one of the content representing the status condition and the content representing the measure, to be shorter than the recognition time for information having both of the content representing the status condition and the content representing the measure.

The vehicle-installed display system according to the first aspect of the invention may further include an information recognition ability determining unit that determines a driver's ability to recognize information, and the recognition time estimating unit may estimate the recognition time for each item of information, based on the driver's ability to recognize information determined by the information recognition ability determining unit.

The vehicle-installed display system as described above may further include a consciousness level detector that detects a consciousness level of the driver, and the information recognition ability determining unit may determine the driver's ability to recognize information, based on the consciousness level of the driver detected by the consciousness level detector.

In the vehicle-installed display system as described above, the information recognition ability determining unit may determine the driver's ability to recognize information, based on the age of the driver.

A second aspect of the invention provides a method of controlling a vehicle-installed display system for displaying a plurality of items of information one after another in a given display area, which includes: estimating a recognition time required for a driver to recognize information displayed in the given display area, with respect to each of the plurality of items of information, and switching the information displayed in the given display area from one item of information to another, based on the recognition time for each item of information.

With the above arrangements, it is possible to display a plurality of items of information on a vehicle-installed display while enabling the driver to efficiently recognize the contents of these items of information.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a block diagram showing an example of the configuration of a vehicle-installed display system according to one embodiment of the invention;

FIG. 10 is a flowchart illustrating the flow of an information displaying process.

DETAILED DESCRIPTION OF EMBODIMENTS

Figure 2C:
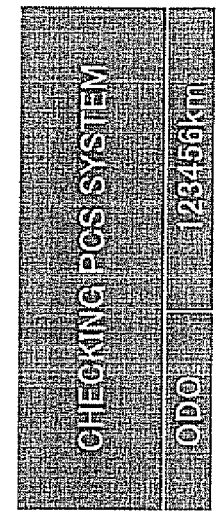
FIG. 2A-FIG. 2F are views showing a first set of examples of display information displayed on a display unit.

One embodiment of the invention will be described with reference to the drawings.

FIG. 1 is a block diagram showing an example of the configuration of a vehicle-installed display system according to one embodiment of the invention. The vehicle-installed display system 100 is installed on a vehicle for controlling display of various types of information, and is configured to display various types of information on a display unit 4, according to status notification signals (i.e., signals for notifying the vehicle-installed display system 100 of a status condition of each system) generated by, for example, an adaptive cruise control system 20 (which will be called "ACC system 20"), a lane departure warning system 21 (which will be called "LDW system 21"), a lane keeping assist system 22 (which will be called "LKA system 22"), and a pre-crush safety system 23 (which will be called "PCS system 23").

The ACC system 20 is a control system for automatically adjusting a distance between vehicles. For example, the ACC system 20 detects a distance between the own vehicle and a preceding vehicle based on an output of a millimeter-wave radar device, or the like, and adjusts the distance between these vehicles by automatically accelerating or decelerating the own vehicle, using an engine ECU, throttle actuator, or a brake actuator, for example.

The LDW system 21 is a warning system for informing the driver of a departure or deviation of the own vehicle from the lane concerned. For example, the LDW system 21 determines whether the own vehicle has passed any of lane partition lines on the opposite sides of the lane in which the own vehicle is currently running, based on an output of a vehicle-mounted camera used for taking pictures of the road, and informs the driver that the own vehicle has passed the lane partition line.

The LKA system 22 is a driving assist system that assists in vehicle control for keeping the own vehicle running in the lane in which the own vehicle is currently running. For example, if an approach of the own vehicle to a lane partition line is detected, based on an output of the vehicle-mounted camera used for taking pictures of the road, the LKA system operates to automatically move the own vehicle in a direction opposite to the direction of the approach to the lane partition lane, using, for example, a steering actuator of an electrically-operated power steering system.

The PCS system 23 is a safety system for lessening the impact of a shock at the time of a collision. For example, if it is determined that a collision with another vehicle or object cannot be avoided, based on an output of a millimeter-wave radar device, or the like, the PCS system 23 raises the brake pressure, using a brake actuator, so that sufficient braking force is generated when the driver presses on the brake pedal.

Each of the ACC system 20, LDW system 21, LKA system 22 and the PCS system 23 (which will be collectively called "associated systems") is equipped with a controller for carrying out a self test (self diagnosis). When any of the associated systems detects a failure or a malfunction in the system itself or its related sensors (such as a vehicle-mounted camera and a millimeter-wave radar device), the system generates a status notification signal to the vehicle-installed display system 100 so as to inform the system 100 of the occurrence of an error in the associated system as a result of the self test.

The vehicle-installed display system 100 has a controller 1, consciousness level detector 2, driver information acquisition unit 3, display unit 4 and a audio output unit 5, and is connected to the associated systems via on-board LAN, such as Control Area Network (CAN) or Local Interconnect Network (LIN).

The controller 1 is a computer including a central processing unit (CPU), random access memory (RAM), read-only memory (ROM), and so forth. The central processing unit (CPU) includes an information transmitting unit or means 10, a recognition time estimating unit or means 11, an output switching unit or means 12 and an information recognition ability determining unit or means 13. For example each of the transmitting unit or means 10, the recornition time estimating unit or means 11, the output switching unit or means 12 and the information recognition ability determining unit or means 13 optionlly include program executable control routines.

The consciousness level detector 2 is a device for detecting the driver's level of consciousness, and may be in the form of a vehicle-mounted camera adapted for taking a picture of the driver's face. The consciousness level detector 2 generates information that enables the controller 1 to determine or select the driver's level of consciousness from a plurality of levels, based on the dozing status of the driver, the influence of drink or alcohol, the frequency of blinks, the degrees of opening of the eyes, the swinging of the head, and so forth.

Also, the consciousness level detector 2 may be a device that measures the heart rate or respiration rate of the driver, or may be a device that measures the brain wave of the driver.

The driver information acquisition unit 3 is a device for acquiring information useful for determining the driver's ability to recognize and make a judgment on matters concerning driving. For example, the driver information acquisition unit 3, which has a function of biometric identity verification for identifying the driver, obtains driver information including the driver's age, etc. recorded in advance in a storage device, such as a hard disc or DVD, based on the result of the identity verification, and generates the obtained driver information to the controller 1.

Also, the driver information acquisition unit 3 may be an information reading device for reading driver information inscribed or printed on the driver's license carried with the driver.

Also, the driver information acquisition unit 3 may be a switch dedicated to acquire driver information. For example, the driver information acquisition unit 3 may be a senior driving mode switch that transmits a signal indicative of a senior driver (who is, for example, 70 years old or above) to the controller 1, in response to a driver's operation to turn on the switch.

The display unit 4 is a device for displaying various types of display information, and is the form of, for example, an instrument panel equipped with a display (such as liquid crystal display, organic electroluminescent (EL) display, or plasma display) capable of displaying various types of information in a limited display area. The display unit 4 receives a display command from the controller 1, and displays display information (composed of textual information, graphic information (such as symbol marks), or a combination thereof) that varies from one status notification signal to another, according to the display command.

Figure 2B:
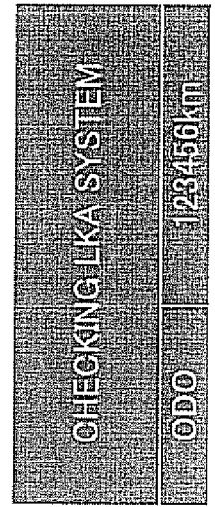
Figure 2A:
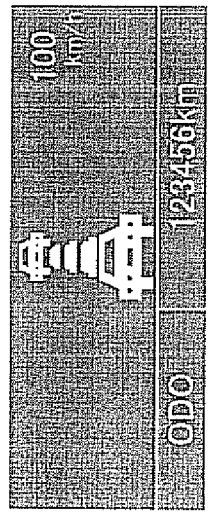

FIG. 2A through FIG. 2F are views showing examples of display information displayed on the display unit 4. FIG. 2A is a display (of a control status) corresponding to a status notification signal that conveys a status condition in which the ACC system 20 is carrying out constant-speed running control for keeping the vehicle running at a constant speed of 100 km/h.

Figure 2F:
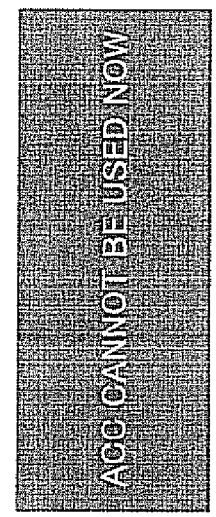
Figure 2E:
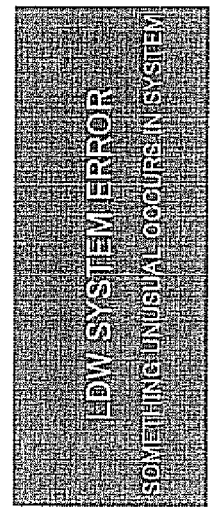
Figure 2D:
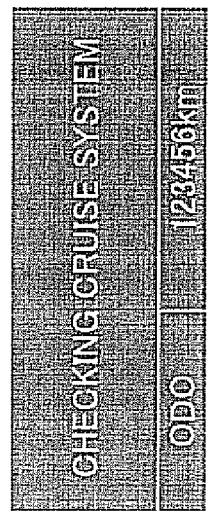

Each of FIG. 2B, FIG. 2C and FIG. 2D is a display (of a diagnosis) corresponding to a status notification signal that conveys a status condition in which the LKA system 22, PCS system 23, or ACC system 20 is running a self-diagnostic test upon start of the engine or after each system is reset due to any trouble (namely, a status condition in which each system is not able to perform its inherent functions).

FIG. 2E is a display (of an error) corresponding to a status notification signal that conveys a status condition in which the LDW system 21 has detected a system error, and FIG. 2F is a display (of an error) corresponding to a status notification signal that conveys a status condition in which the ACC system 20 cannot be used.

The audio output unit 5 is a device for producing a audio output of various audio information, and is in the form of, for example, a vehicle-mounted loudspeaker. The audio output unit 5 receives a audio output command from the controller 1, and sounds a beep or a voice message that varies from one status notification signal to another, according to the audio output command.

Next, various units or means provided in the controller 1 will be described.

The information transmitting means 10 is a unit that transmits various types of information to the driver. For example, the information transmitting means 10 produces a display command or audio output command (which will be collectively called "output command") corresponding to each status notification signal, based on status notification signals generated by the associated systems, and generates the produced output command to a corresponding one of the display unit 4 and the audio output unit 5. The information transmitting means 10 may generate both of the display command and the audio output command at the same time, or may generate only one of the display command and the audio output command.

The information transmitting means 10 continues generating an output command corresponding to a status notification signal until the associated system stops generating the status notification signal, so as to keep the display unit 4 displaying the information or keep the audio output unit 5 producing a audio output. However, even in the case where a particular status notification signal is kept received, the information transmitting means 10 may stop generating an output command corresponding to the particular status notification signal after a lapse of a predetermined time from the receipt of the status notification signal.

Also, even in the case where the associated system stops generating a particular status notification signal, the information transmitting means 10 may continue generating an output command corresponding to the particular status notification signal until a predetermined time elapses from the receipt of the status notification signal.

Where the information transmitting means 10 receives two or more status notification signals from the associated systems at the same time, the information transmitting means 10 sequentially and cyclically generates two or more output commands corresponding to the two or more status notification signals, so that information corresponding to all of the received status notification signals can be transmitted to the driver in as short a time as possible.

The information transmitting means 10 may implement the information transmission as described above, in such a manner that it generates one output command for causing the display unit 4 or audio output unit 5 to start providing a display or a audio output, and subsequently generates one stop command for causing the display unit 4 or audio output unit 5 to finish providing the display or audio output.

Also, the information transmitting means 10 may determine the order in which it generates two or more output commands, based on the priority set in advance for each status notification signal (for example, the highest priority is given to a status notification signal(s) concerned with safety).

In the above case, the information transmitting means 10 may stop producing or generating an output command(s) corresponding to a part of the received status notification signals, and may produce or generate only the output command(s) corresponding to the status notification signal(s) having a certain level of or higher priority, based on the priority set in advance for each status notification signal. In this manner, the information transmitting means 10 is able to transmit high-priority information to the driver in as short a time as possible.

The recognition time estimating means 11 is unit that estimating, for each status notification signal, a length of time (which will be called "recognition time") required for the driver to recognize display information displayed based on a display command corresponding to the status notification signal. For example, the recognition time estimating means 11 estimates the recognition time based on the amount of information in the display information.

The above-mentioned "amount of information" is a concept derived from information theory, and indicates how unlikely to occur is a certain event when the event occurs. Namely, the amount of information in the information that makes it known that an event that frequently occurs has actually occurred is smaller than the amount of information in the information that makes it known that an event that rarely occurs has actually occurred.

The amount of information for each item of display information may be a preset value, or may be a value that varies with time (or varies depending on the frequency with which each display information is displayed).

In the manner as described above, among status conditions represented by status notification signals generated by the associated systems, the recognition time estimating means 11 estimates the recognition time for display information indicating a status condition of which the frequency of occurrence is low, to be a relatively long time, and estimates the recognition time for display information indicating a status condition of which the frequency of occurrence is high, to be a relatively short time.

Also, the recognition time estimating means 11 may estimate the recognition time for each item of display information, based on the number of words in textual information included in the display information, the number of characters in the textual information, or the number of pixels (used for forming characters) in the textual information, or based on the color, size, or font of the characters, for example. The recognition time estimating means 11 may also estimate the recognition time for each item of display information, based on the color of graphic information included in the display information, the size of the graphic information, or the background color of the graphic information, for example.

For example, the textual information in the display information as shown in FIG. 2E includes 8 words, "LDW", "SYSTEM", "ERROR", "SOMETHING", "UNUSUAL", "OCCURS", "IN", "SYSTEM". On the other hand, the textual information in the display information as shown in FIG. 2F includes five words, "ACC" "CANNOT", "BE", "USED", "NOW". Therefore, the recognition time estimating means 11 estimates the recognition time for the display information indicated in FIG. 2E, to be longer than the recognition time for the display information indicated in FIG. 2F.

Figure 3:
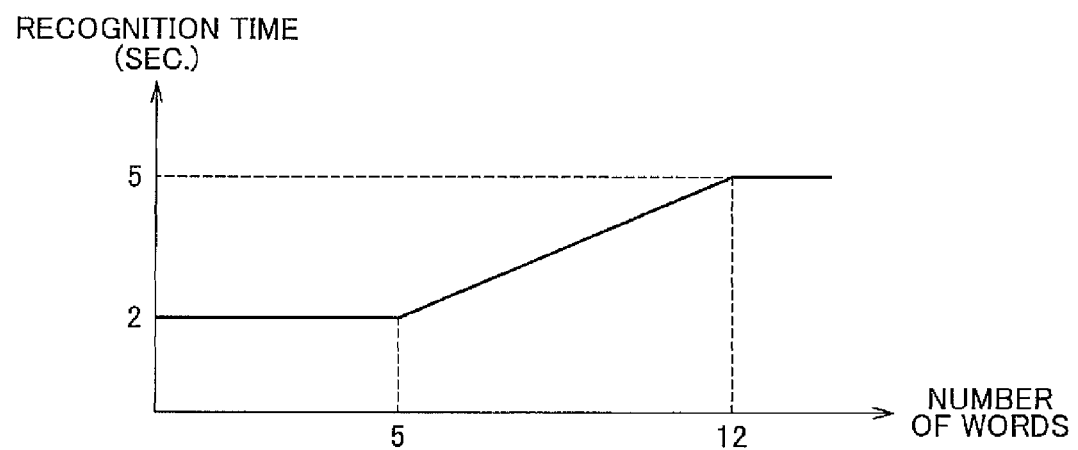
FIG. 3 is a graph showing one example of the relationship between the number of words contained in textual information and the recognition time.

FIG. 3 is a graph showing one example of the relationship between the number of words contained in textual information and the recognition time. In FIG. 3, the horizontal axis indicates the number of words, and the vertical axis indicates the recognition time. The recognition time estimating means 11 sets the recognition time to 2 seconds when the number of words is 5 or smaller, increases the recognition time from 2 seconds to 5 seconds as the number of words increases from 5 to 12, and sets the recognition time to 5 seconds when the number of words is 12 or larger.

Referring to a look-up table indicating the relationship stored in the ROM of the controller 1 and shown in the graph of FIG. 3, the recognition time estimating means 11 estimates the recognition time for the display information shown in FIG. 2E at 3-4 seconds (corresponding to 8 words), and estimates the recognition time for the display information shown in FIG. 2F at 2 seconds (corresponding to 5 words).

Also, the recognition time estimating means 11 may estimate the recognition time for each item of display information, based on the content of the display information.

The content of the display information is classified in advance into two or more categories. For example, the content of the display information is classified into two categories, i.e., a "status" category indicating a status condition of an event that arises at present, and a "solution" category indicating a measure or action which the driver can take against a particular condition.

The content of the display information may also be classified into three categories, i.e., a "cause" category indicating a cause of a particular condition that has appeared, a "result" category indicating the particular condition that has appeared, and a "solution" category indicating a measure or action which the driver can take against the particular condition. The content of the display information may also be classified into four or more categories.

Figure 4A:
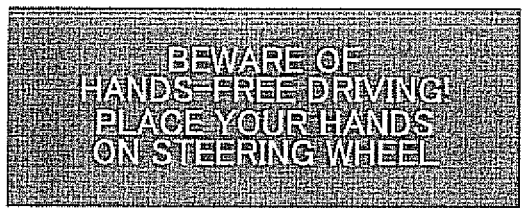
FIG. 4A-FIG. 4D are views showing a second set of examples of display information displayed on the display unit.

FIG. 4A through FIG. 4D are views showing additional display examples of display information displayed on the display unit 4. FIG. 4A is a display corresponding to a status notification signal that conveys a fact that the LKA system 22 has detected hands-free driving by the driver (i.e., the driver lets the vehicle run without using his/her hands), based on an output of a vehicle-mounted camera for taking a picture of the driver, and has temporarily stopped its lane keeping assist function. In this case, the display information includes textual information "BEWARE OF HANDS-FREE DRIVING!" that points out a driver's status condition and belongs to the "status" category, and textual information "PLACE YOUR HANDS ON STEERING WHEEL" that belongs to the "solution" category and notifies the driver of an action which the driver should take so as to resume the lane keeping assist function of the LKA system 22.

Figure 4B:
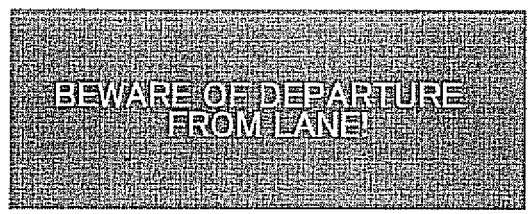

FIG. 4B is a display corresponding to a status notification signal that coveys a fact that the LKA system 22 has detected a departure of the vehicle from the lane, based on an output of a vehicle-mounted camera for taking a picture of a scene ahead of the own vehicle, and attempts to draw a driver's attention to the departure. In this case, the display information includes textual information "BEWARE OF DEPARTURE FROM LANE!" that points out the status condition of the own vehicle and belongs to the "status" category, but does not include textual information that belongs to the "solution" category.

Figure 4C:

FIG. 4C is a display corresponding to a status notification signal that conveys a fact that the LKA system 22 has detected an error in a self-diagnostic test conducted upon start of the engine. In this case, the display information includes textual information "LKA SYSTEM ERROR" that points out a cause of an abnormality and belongs to the "cause" category, textual information "LANE KEEPING ASSIST IS NOT AVAILABLE" that indicates a condition arising from the occurrence of the abnormality, and textual information "NEED CHECKUP AT DEALER" that indicates a measure or action the driver can take and belongs to the "solution" category.

Figure 4D:
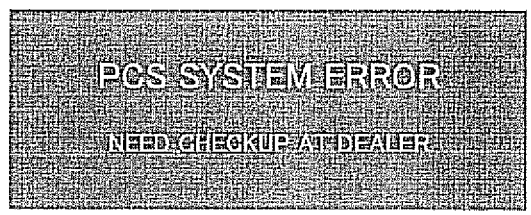

FIG. 4D is a display corresponding to a status notification signal that conveys a fact that the PCS system 23 has detected an error in a self-diagnostic test conducted upon start of the engine. In this case, the display information includes textual information "PCS SYSTEM ERROR" that points out a cause of an abnormality and belongs to the "cause" category, and textual information "NEED CHECKUP AT DEALER" that indicates a measure or action the driver can take and belongs to the "solution" category, but does not include textual information that belongs to the "result" category.

Figure 5:
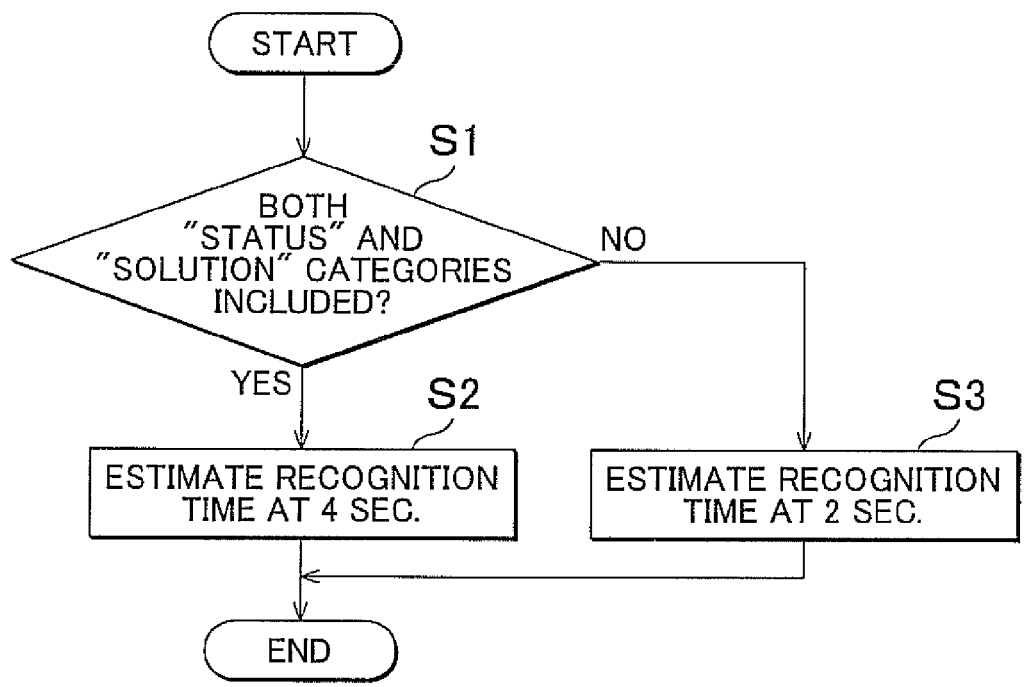
FIG. 5 is a flowchart illustrating the flow of a recognition time estimating process.

Referring now to FIG. 5, a process (which will be called "recognition time estimating process) run by the recognition time estimating means 11 to estimate the recognition time based on a combination of the categories of textual information included in display information. FIG. 5 is a flowchart illustrating the control flow of the recognition time estimating process. When the controller 1 receives two or more status notification signals from the associated systems at the same time, it executes the recognition time estimating process on each item of display information corresponding to each of the status notification signals.

Initially, the recognition time estimating means 11 retrieves one or more items of textual information included in the display information corresponding to the status notification signal, from a textual information database. In this connection, textual information is searchably stored in the textual information database prepared in the ROM of the controller 1, and each record of the textual information database includes fields, such as the number of words, the number of characters, the number of pixels, color, size, font, and category.

Subsequently, the recognition time estimating means 11 determines whether the display information includes both of textual information belonging to the "status" category and textual information belonging to the "solution" category (step S1).

If both of the textual information belonging to the "status" category and the textual information belonging to the "solution" category are included in the display information, the recognition time estimating means 11 estimates the recognition time required for the driver to recognize the display information at 4 seconds, for example (step S2).

If, on the other hand, only one of the textual information belonging to the "status" category and the textual information belonging to the "solution" category is included in the display information, the recognition time estimating means 11 estimates the recognition time required for the driver to recognize the display information at 2 seconds, for example (step S3). This is because a longer time is presumed to be required to understand the content of the textual information belonging to two categories and displayed at the same time, than the time required to understand the content of the textual information belonging to one category.

In the above example, the recognition time estimating means 11 estimates the recognition time for each item of display information based on the number of categories included in the display information, without taking account of an attribute or attributes (such as the number of words) other than the category with respect to each item of textual information managed as one record of the textual information database. However, the recognition time estimating means 11 may estimate the recognition time for each display information, taking account of an attribute(s) other than the category in addition to or in place of the number of categories.

For example, the recognition time estimating means 11 may estimate the recognition time for display information belonging to one category and having a relatively large number of words, to be longer than the recognition time for display information belonging to two categories and having a relatively small number of words.

The recognition time estimating means 11 may adjust the recognition time estimated based on the textual information, or estimate the recognition time itself, according to environmental conditions (such as the brightness of the surroundings of the display unit 4) or vehicle running conditions (such as the running speed), as well as information associated with textual information. For example, the recognition time tends to be increased as the surroundings of the display unit 4 are brighter, since the bright surroundings make a display less visible. As another example, the recognition time tends to be increased as the running speed is higher, since a length of time for which the driver takes a continuous look at the display unit 4 is limited during high-speed running.

Referring back to FIG. 1, explanation of each means of the controller 1 will be continued.

The output switching means 12 is a unit that switches display information displayed on the display unit 4, or that switches audio information generated by the audio output unit 5. For example, the output switching means 12 controls the output timing of two or more display commands transmitted from the information transmitting means 10 to the display unit 4, according to the recognition time estimated by the recognition time estimating means 11 for each item of display information.

Figure 6:
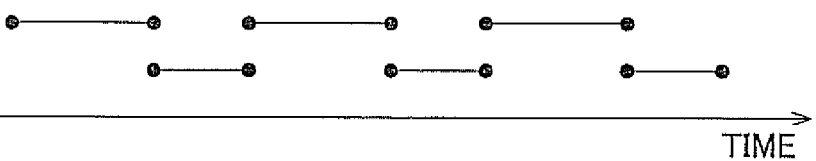
FIG. 6 is a view showing the switching timing when two items of display information are alternately displayed one after the other.

Referring now to FIG. 6, the timing of switching of the display information will be explained. FIG. 6 shows the timing of switching between two items of display information, i.e., the display information as shown in FIG. 2E and the display information as shown in FIG. 2F, when these items of information are alternately displayed.

As shown in FIG. 6, when the recognition time estimating means 11 estimates the recognition time for the display information as shown in FIG. 2E at 3 seconds, and estimates the recognition time for the display information as shown in FIG. 2F at 2 seconds, the output switching means 12 causes the display information of FIG. 2E to be displayed in a certain display area for 3 seconds, and then causes the display information of FIG. 2F in the same display area as that in which the display information of FIG. 2E was displayed, for 2 seconds. Subsequently, the output switching means 12 alternately and repeatedly provides a display of the display information of FIG. 2E and a display of the display information of FIG. 2F in the same manner, as shown in FIG. 6.

With the above arrangement, the output switching means 12 sequentially and cyclically displays two or more items of display information while switching from one item of information to another, such that each item of display information is displayed for a display time necessary and sufficient to allow the driver to recognize the content of the display information while it is displayed once. Thus, the output switching means 12 is able to inform the driver of the information to be transmitted to the driver in a short time, with improved reliability.

When the information transmitting means 10 receives two or more status notification signals from the associated systems at substantially the same time, the output switching means 12 may display two or more items of display information corresponding to the respective status notification signals in sequence, only for a limited period of time (e.g., 3 seconds) after display starts, while switching from one item of display information to another at extremely short intervals (e.g., 0.5 second).

The above-described output switching mode is employed so as to surely inform the driver of the number of the items of display information before the content of each item of display information is conveyed to the driver. If the switching of the display information is started using the recognition time estimated by the recognition time estimating means 11, the driver would have to see at least one of the two or more items of display information twice since the driver is not aware of the total number of the items of display information. Namely, the driver would not be convinced that he/she has seen all of the items of the display information to be conveyed, until the driver confirms that a certain item of display information that has been seen or checked once is displayed again.

Also, if the driver is aware of the total number of the items of display information, the possibility that the driver overlooks any item or items of the display information is advantageously reduced. (If the driver is not aware of the total number, the driver would be convinced that he/she has seen all of the items of display information at the time when he/she confirms that a certain item of display information that has been seen once is displayed again, even if overlooking takes place during displaying.)

In this case, the output switching means 12 may switch the background color of the display area in which textual information is displayed, in accordance with switching of the display information. In this manner, the driver will more easily grasp the number of switching of the display information (namely, the number of items of the display information).

Furthermore, the output switching means 12 may perform switching of audio information corresponding to the respective items of display information, in synchronization with switching of the display information.

Also, the output switching means 12 may control the switching timing, using a length of time (which will be called "substantial visually checking time") for which the driver actually looks at the display unit 4, in addition to or in place of the time measured by a timer.

For example, the output switching means 12 detects the driver's line of sight based on an output of a vehicle-mounted camera that captures an image of the driver's face, and counts the substantial visually checking time when the driver's line of sight is directed at the display unit 4, but does not count the substantial visually checking time when the driver's line of sight is not directed at the display unit 4.

In the above manner, the output switching means 12 sequentially and cyclically displays two or more items of display information one after another, such that each item of display information is displayed only for the substantial visually checking time (which does not include a duration of time that the driver does not look at the display unit 4) necessary and sufficient to allow the driver to recognize the content of the display information. Thus, the output switching means 12 is able to inform the driver of the information to be conveyed to the driver in a short time, with improved reliability.

The information recognition ability determining means 13 is a unit that determines the driver's ability to recognize information. For example, the information recognition ability determining means 13 determines the driver's dynamic ability to recognize information at the present time, based on the output of the consciousness level detector 2.

In this case, the information recognition ability determining means 13 detects the degree of opening of the driver's eyes at given time intervals, based on an output of a vehicle-mounted camera for taking a picture of the driver's face, as an example of the consciousness level detector 2, and indicates the degree of opening of the driver's eyes at each point in time as a percentage relative to the degree of opening of the driver's eyes at the time of getting aboard as a standard condition (100%). The thus obtained percentage, which is equivalent to the consciousness level, or information recognition ability, detected at that point in time, is a result of the determination of the information recognition ability by the information recognition ability determining means 13.

Figure 7:
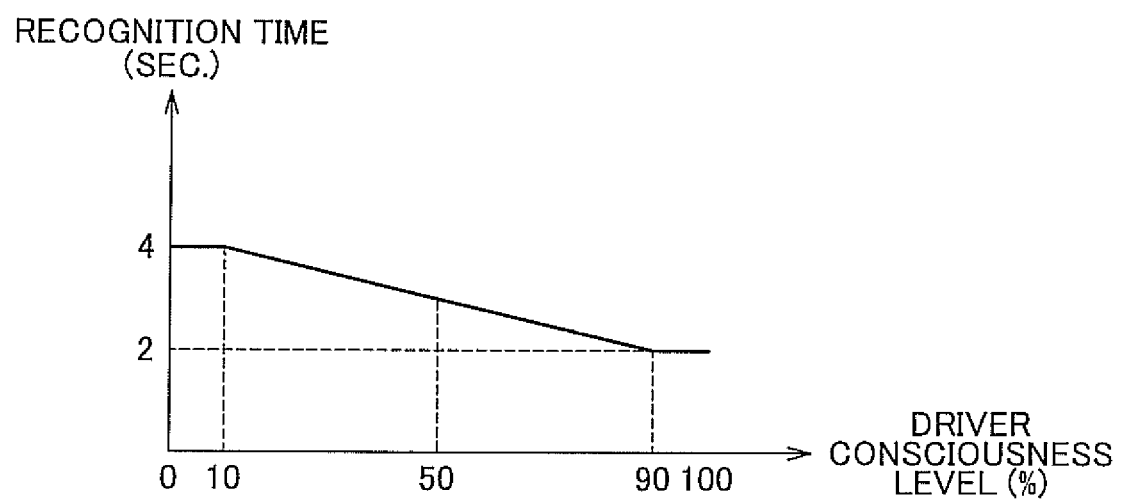
FIG. 7 is a graph showing one example of the relationship between the consciousness level of the driver and the recognition time.

FIG. 7 is a graph showing one example of the relationship between the consciousness level (information recognition ability) of the driver and the recognition time. In FIG. 7, the vertical axis indicates the recognition time, and the horizontal axis indicates the consciousness level of the driver. The recognition time estimating means 11 sets the recognition time to 4 seconds when the information recognition ability determining means 13 determines that the driver's ability to recognize information is low, namely, when the consciousness level is equal to or lower than 10%, and reduces the recognition time from 4 seconds to 2 seconds as the consciousness level increases from 10% to 90%. The recognition time estimating means 11 sets the recognition time to 2 seconds when the information recognition ability determining means 13 determines that the driver's ability to recognize information is high, namely, when the consciousness level is equal to or higher than 90%.

The information recognition ability determining means 13 determines the driver's static ability to recognize information, based on an output of the driver information acquisition unit 3.

In this case, the driver information acquisition unit 3 identifies the driver with the function of biometric identity verification, and the information recognition ability determining means 13 uses the age of the driver identified by the driver information acquisition unit 3, as a measure of the driver's ability to recognize information. Generally, the time required to recognize information and make a decision is longer as the driver's age is higher.

Figure 8:
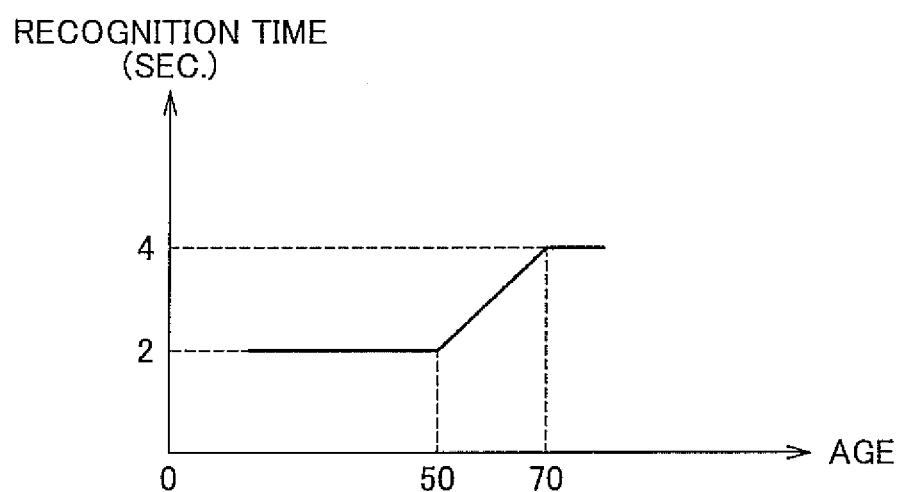
FIG. 8 is a graph showing one example of the relationship between the age of the driver and the recognition time.

FIG. 8 is a graph showing one example of the relationship between the age (information recognition ability) of the driver and the recognition time. In FIG. 8, the vertical axis indicates the recognition time, and the horizontal axis indicates the age of the driver. The recognition time estimating means 11 sets the recognition time to 2 seconds when the information recognition ability determining means 13 determines that the driver's ability to recognize information is high, namely, when the driver's age is equal to or under 50, and increases the recognition time from 2 seconds to 4 seconds as the driver's age increases from 50 to 70. The recognition time estimating means 11 sets the recognition time to 4 seconds when the information recognition ability determining means 13 determines that the driver's ability to recognize information is low, namely, when the driver's age is equal to or above 70.

The recognition time is estimated in the above manner for the following reasons: with regard to the same display content, a longer time is required for the driver to understand the display content if the driver has a lower ability to recognize information. Also, even if the driver has a high ability to recognize information, he/she cannot understand the display content unless some length of display time (2 seconds in this example) is provided to the driver.

The information recognition ability determining means 13 may also determine the driver's ability to recognize information, based on driver information other than the age of the driver (for example, the presence or absence of a restriction, such as wearing of eyeglasses, inscribed on the driver's license, the time lapsed after the driver obtained the driver's license, etc.).

Also, the recognition time estimating means 11 may adjust the recognition time that has already been estimated by another estimating method, based on the age of the driver, instead of directly deriving the recognition time based on the age of the driver used by the information recognition ability determining means 13 as a measure of the information recognition ability.

Figure 9:
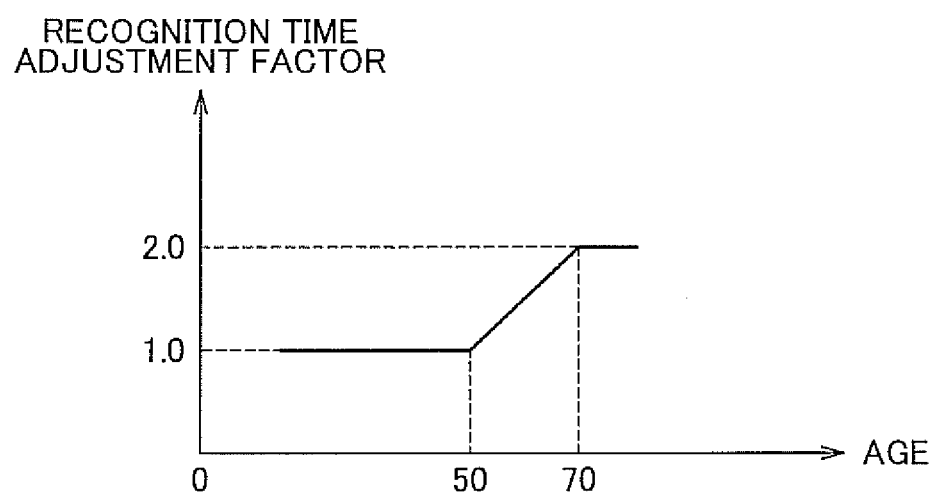
FIG. 9 is a graph showing one example of the relationship between the age of the driver and a recognition time adjustment factor.

FIG. 9 is a graph showing one example of the relationship between the age of the driver and the recognition time adjustment factor. In FIG. 9, the vertical axis indicates the recognition time adjustment factor, and the horizontal axis indicates the age of the driver. The recognition time estimating means 11 sets the recognition time adjustment factor to 1.0 (namely, no adjustment is made, and the estimated recognition time is used as it is) when the information recognition ability determining means 13 determines that the driver's ability to recognize information is high, namely, when the driver's age is equal to or under 50, and increases the recognition time adjustment factor from 1.0 to 2.0 times as the age increases from 50 to 70. The recognition time estimating means 11 sets the recognition time adjustment factor to 2.0 times (namely, the estimated recognition time is doubled, and the doubled time is used as an adjusted recognition time) when the information recognition ability determining means 13 determines that the driver's ability to recognize information is low, namely, when the driver's age is equal to or above 70.

Also, the recognition time estimating means 11 may adjust the recognition time with the recognition time adjustment factor as shown in FIG. 9, even when the recognition time is estimated based on the consciousness level of the driver.

Referring next to FIG. 10, a process (which will be called "information displaying process") run by the controller 1 of the vehicle-installed display system 11 to display information on the display unit 4 will be described. FIG. 10 is a flowchart illustrating the control flow of the information displaying process, and the controller 1 repeatedly executes the information displaying process at certain time intervals while the ignition switch is in the ON state.

Initially, the controller 1 determines whether there is display information to be displayed on the display unit 4, by monitoring the output signals of the associated systems.

If it is determined that there is no display information to be displayed (i.e., if NO is obtained in step S11), the controller 1 once finishes the information displaying process, and gets ready for the next cycle of the routine.

If it is determined that there is display information to be displayed (i.e., if YES is obtained in step S11), the controller 1 determines whether there are two or more items of display information to be displayed (step S12).

If it is determined that there are two or more items of display information to be displayed (i.e., if YES is obtained in step S12), the controller 1 causes the information transmitting means 10 to produce an output command corresponding to each status notification signal, based on the status notification signals generated by the associated systems. Also, the controller 1 estimates a recognition time required for the driver to recognize display information displayed based on the display command (output command) corresponding to each of the status notification signals (step S13).

In step S13, the recognition time estimating means 11 estimates the recognition time according to, for example, the number of words in textual information included in the display information. The recognition time estimating means 11 may estimate the recognition time for each status notification signal, using the result of determination made by the information recognition ability determining means 13 on the driver's ability to recognize information, or may adjust the recognition time estimated based on the number of words, or the like, using the result of determination on the driver's ability to recognize information.

Subsequently, the controller 1 causes the output switching means 12 to sequentially and cyclically display the two or more items of display information one after another on the display unit 4, using the recognition time estimated for each item of display information by the recognition time estimating means 11 (step S14).

On the other hand, if it is determined that two or more items of display information to be displayed do not exist (NO is obtained in step S12), namely, if there is only one item of display information to be displayed, the controller 1 causes the information transmitting means 10 to produce an output command based on the one status notification signal generated by the relevant associated system, and generate the produced output command to the display unit 4, so that the corresponding display information is displayed on the display unit 4 (step S15).

With the above arrangement, when the vehicle-installed display system 100 sequentially and cyclically displays two or more items of display information, the system 100 sets one display time for each item of display information with flexibility, according to the content of the display information and/or the driver's ability to recognize information. If, on the other hand, two or more items of display information are displayed one after another at a specified (or fixed) switching interval that is determined irrespective of the content of the display information and the driver's ability to recognize information, the driver may feel uncomfortable or get embarrassed when a certain item of display information that requires a relatively short time to be recognized by the driver is displayed for a longer time than necessary, or when a certain item of display information that requires a relatively long time to be recognized by the driver is displayed only for a short time. The above-described arrangement of this embodiment avoids these situations or lessens the likelihood of these situations. Furthermore, the above arrangement enables the driver to efficiently recognize the contents of two or more items of display information that are sequentially displayed one after another.

While one embodiment of the invention has been described above in detail, the invention is not limited to the illustrated embodiment, but may be embodied with various changes, modifications or replacement, without departing from the scope of the invention.

While the vehicle-installed display system 100 displays two or more items of display information one after another in a single display area prepared on the display unit 4 in the illustrated embodiment, the two or more items of display information may be displayed one after another in each of two or more display areas prepared on the display unit 4.

In this case, the vehicle-installed display system 100 may synchronize or equalize the switching timing of the display information in each of the display areas (for example, two items of display information displayed in two display areas are switched to two other items of display information at the same time), or may individually control the switching timing of the display information in each of the display areas.

Where the vehicle-installed display system 100 has two or more display areas, a certain item of display information displayed in one of the display areas may be displayed again in another display area at the next switching time.

In the above manner, the driver is able to recognize the contents of the two or more items of display information displayed in sequence in a first display area only by looking at the first display area (assuming that all of the items of display information are displayed in sequence in the first display area). Further, if the content of a particular item of display information displayed in the first display area can be recognized earlier than the next switching time, the driver is able to recognize the content of another item of display information earlier by looking at a second region (in which another item of display information supposed to be displayed in the first display area at the next switching time is currently displayed).

Also, even where the driver could not recognize the content of a particular item of display information displayed in the first display area during one display time, he/she can check the content of the particular display information by looking at a third display area (in which the particular item of display information that has been displayed in the first display area is displayed at the next switching time).

The information displayed by the vehicle-installed display system 100 may be composed of two or more items of information having different contents, which are selected from information concerning vehicle running conditions, information concerning the status of a vehicle-installed control system or systems, and information useful for drawing a driver's attention or giving a warning to the driver.

The output switching means 12 may change the display time for information displayed on the display unit 4, according to the recognition time estimated by the recognition time estimating means 11 for each item of display information. In this case, the display time set for each item of display information is longer as the recognition time estimated by the recognition time estimating means 11 for the item of display information is longer. The display time for each item of information, which is controlled by the output switching means 12, may be equal to or different from the recognition time estimated by the recognition time estimating means 11.

What is claimed is:

1. A vehicle-installed display system for displaying a plurality of items of information one after another in a given display area, each of the plurality of items of information have content that is classified into a plurality of categories, said system comprising:
- a controller having a recognition time estimating unit and an output switching unit;
- the recognition time estimating unit that estimates a recognition time required for a driver to recognize information displayed in the given display area, the recognition time estimating unit estimating the recognition time for each of the plurality of items of information based on a number of categories of content included in each of the plurality of items of information; and
- the output switching unit that switches the information displayed in the given display area from one item of information to another, based on the recognition time estimated by the recognition time estimating unit for each item of information.

2. The vehicle-installed display system according to claim 1, wherein the recognition time estimating unit estimates the recognition time for each item of information, based on the amount of information in the information displayed in the given display area.

3. The vehicle-installed display system according to claim 1, wherein the recognition time estimating unit estimates the recognition time for each item of information, based on at least one of the number of words in textual information, the number of characters in the textual information, the number of pixels in the textual information, a color of the characters, a size of the characters, a font of the characters, a color of graphic information, a size of the graphic information, and a background color of the graphic information, which are included in the information displayed in the given display area.

4. The vehicle-installed display system according to claim 1, wherein:
- the content includes at least one of a content representing a status condition of an event that occurs at present, and a content representing a measure which the driver can take against the status condition; and
- the recognition time estimating unit sets the recognition time for information having one of the content representing the status condition and the content representing the measure, to be shorter than the recognition time for information having both of the content representing the status condition and the content representing the measure.

5. The vehicle-installed display system according to claim 1, wherein the controller further includes an information recognition ability determining unit that determines a driver's ability to recognize information, wherein
- the recognition time estimating unit estimates the recognition time for each item of information, based on the driver's ability to recognize information determined by the information recognition ability determining unit.

6. The vehicle-installed display system according to claim 5, further comprising a consciousness level detector that detects a consciousness level of the driver, wherein
- the information recognition ability determining unit determines the driver's ability to recognize information, based on the consciousness level of the driver detected by the consciousness level detector.

7. The vehicle-installed display system according to claim 5, wherein the information recognition ability determining unit determines the driver's ability to recognize information, based on the age of the driver.

8. The vehicle-installed display system according to claim 1, wherein the plurality of items of information displayed in the given display area comprise two or more items of information having different contents, which are selected from information concerning vehicle running conditions, information concerning status conditions of vehicle-installed control systems, and information useful for drawing a driver's attention or giving a warning to the driver.

9. The vehicle-installed display system according to claim 1, wherein the output switching unit changes a display time for which information is displayed in the given display area, depending on the recognition time estimated by the recognition time estimating unit.

10. The vehicle-installed display system according to claim 9, wherein:
- the plurality of items of information include a first item of information and a second item of information;
- the recognition time estimating unit estimates a first recognition time corresponding to the first item of information and a second recognition time corresponding to the second item of information; and
- when the first recognition time is longer than the second recognition time, the output switching unit sets the display time for the first item of information to be longer than the display time for the second item of information.

11. The vehicle-installed display system according to claim 2, wherein the recognition time estimating unit estimates the recognition time for a given item of information to be longer as the amount of information in the given item of information is larger.

12. The vehicle-installed display system according to claim 3, wherein the recognition time estimating unit estimates the recognition time for a given item of information to be displayed in the given display area, to be longer as the number of words or the number of characters in textual information included in the given item of information is larger.

13. The vehicle-installed display system according to claim 5, wherein the recognition time estimating unit estimates the recognition time to be shorter as the driver's ability to recognize information is higher.

14. The vehicle-installed display system according to claim 1, wherein the recognition time estimating unit estimates the recognition time for each item of information, based on at least one of environmental conditions and vehicle running conditions.

15. The vehicle-installed display system according to claim 1, wherein the output switching unit displays the plurality of items of information while switching from one item of information to another at intervals of a predetermined display time, and then displays the plurality of items of information while switching from one item of information to another each time a display time for each item of information which is determined based on the recognition time estimated by the recognition time estimating unit expires.

16. A method of controlling a vehicle-installed display system for displaying a plurality of items of information one after another in a given display area, each of the plurality of items of information have content that is classified into a plurality of categories, said method comprising:
- estimating a recognition time required for a driver to recognize information displayed in the given display area, with respect to each of the plurality of items of information, the recognition time being estimated for each of the plurality of items of information based on a number of categories of content included in each of the plurality of items of information; and
- switching the information displayed in the given display area from one item of information to another, based on the recognition time for each item of information.

17. A vehicle-installed display system for displaying a plurality of items of information one after another in a given display area, comprising:
- a controller having a recognition time estimating unit, an output switching unit, and an information recognition ability determining unit; and
- a consciousness level detector that detects a consciousness level of a driver;
- the recognition time estimating unit that estimates a recognition time required for the driver to recognize information displayed in the given display area, with respect to each of said plurality of items of information;
- the output switching unit that switches the information displayed in the given display area from one item of information to another, based on the recognition time estimated by the recognition time estimating unit for each item of information;
- the information recognition ability determining unit that determines a driver's ability to recognize information based on the consciousness level of the driver detected by the consciousness level detector;
- wherein the recognition time estimating unit estimates the recognition time for each item of information, based on the driver's ability to recognize information determined by the information recognition ability determining unit.

* * * * *